United States Patent [19]

Noviello

[11] Patent Number: 5,793,235

[45] Date of Patent: Aug. 11, 1998

[54] CIRCUIT FOR IMPROVING TIMING CONDITIONS IN A DATA PROCESSING UNIT

[75] Inventor: Donald D. Noviello, Germantown, Md.

[73] Assignee: Hughes Electronics Corporation, El Segundo, Calif.

[21] Appl. No.: 600,577

[22] Filed: Feb. 13, 1996

[51] Int. Cl.[6] ............................................... H03K 3/017
[52] U.S. Cl. ................................... 327/176; 327/225
[58] Field of Search ................................. 327/176, 225

[56] References Cited

U.S. PATENT DOCUMENTS

| | | | |
|---|---|---|---|
| 5,093,902 | 3/1992 | Tokumitsu | 395/511 |
| 5,552,991 | 9/1996 | Lee et al. | 364/464.2 |
| 5,563,884 | 10/1996 | Fimoff et al. | 370/391 |
| 5,579,308 | 11/1996 | Humpleman | 370/352 |
| 5,635,989 | 6/1997 | Rothmuller | 348/563 |

*Primary Examiner*—David C. Nelms
*Assistant Examiner*—Hoai Ho
*Attorney, Agent, or Firm*—John Whelan; Michael Sales

[57] ABSTRACT

A circuit for use with a data processing circuit having a transport chip for routing data is provided. The circuit includes a discrete digital logic circuit for sampling digital input signals and for generating a digital output timing signal based on the state of the digital input signals at any given point in time. The circuit minimizes default timing conditions in the transport chip.

9 Claims, 4 Drawing Sheets

CIRCUIT FOR IMPROVING TIMING CONDITIONS IN A DATA PROCESSING UNIT

BACKGROUND OF THE INVENTION

1. Field of the Invention

This invention relates to the field of digital timing and control circuitry.

2. Description of the Prior Art

The use of most commercial digital integrated circuits ("IC") requires the addition of discrete external circuits for carrying out certain interfacing requirements. For example, a chip select signal may be required when a specific device is selected for an operation, or an address or data strobe may be required when address or data information is available for reading. Certain application specific IC's, however, are designed to directly interface with each other and therefore should not require any external discrete interface logic.

Some application specific IC's, although commonly used in combination, however, do not interface cleanly. Satellite television and cablevision receivers employ certain standard commercial IC's such as transport chips and Motion Picture Experts Group audio/video decoder ("MPEG decoder") chips. The transport chip is responsible for receiving the input data stream from the satellite or cable transmitter and interpreting the protocol. The transport chip receives the incoming data stream and separates that data stream into its component segments for transporting to the appropriate circuit components. The MPEG decoder chip decodes digital audio and video data received from the transport chip for display on a standard television. Therefore, transport chips are designed to readily interface with most MPEG decoder chips.

Particular combinations of transport and MPEG decoder chips, however, create unique problems in the timing of their interface. For example, interfacing the SGS-Thomson transport chip (Part No. STMKASA) with the LSI Logic Corp. MPEG decoder chip (Part No. L64002) creates a specific problem during a write cycle to the MPEG decoder chip. When the system's micro-controller initiates either a read cycle or a write cycle, the transport chip sends a wait signal to the micro-controller during the execution of the particular command. For instance, upon initiation of a read cycle the transport chip receives a high to low transition (edge) on a wait signal from the MPEG decoder chip and sends a coinciding wait signal to the micro-controller. Once the MPEG decoder chip places the requested data on the address/data bus, the MPEG decoder chip sends a low to high transition (edge) on the wait signal to the transport chip. Upon receiving the low to high edge from the MPEG decoder chip, the transport chip releases the wait signal to the micro-controller which indicates that the requested data is available on the address/data bus. During a write cycle, however, the MPEG decoder chip does not generate any edges on the wait signal to the transport chip. In that instance, the transport chip sends a wait signal to the micro-controller for a long default wait period which unnecessarily halts the micro-controller and reduces system performance.

It is therefore an object of the present invention to provide a digital edge generating circuit ("wait state modifier") which senses certain circuit conditions and generates transitions (edges) in digital signals as required in accordance with the specifications of system circuit components.

SUMMARY OF THE INVENTION

The present invention has been developed to overcome the aforementioned problem related to the interfacing of particular transport and MPEG decoder chips in television, cablevision and satellite receivers.

Accordingly, the present invention generally relates to a data processing circuit with a transport chip and a digital edge generating circuit, or wait state modifier. The digital edge generating circuit senses a predetermined pattern of digital input signals and generates related transitions in a digital output signal. The digital edge generating circuit includes a discrete digital logic circuit which samples digital input signals and generates a digital output timing signal based on the state of the digital input signals at predetermined points in time. The digital edge generating circuit optimizes circuit timing by minimizing default timing conditions in the transport chip.

As discussed in detail below, the wait state modifier of the present invention provides an important solution to the interface of some commercial application specific IC's, including transport and MPEG decoder chips.

The invention itself, together with further objects and attendant advantages, will best be understood by reference to the following detailed description, taken in conjunction with the accompanying drawings.

DETAILED DESCRIPTION OF THE PREFERRED EMBODIMENT

Figure 1:
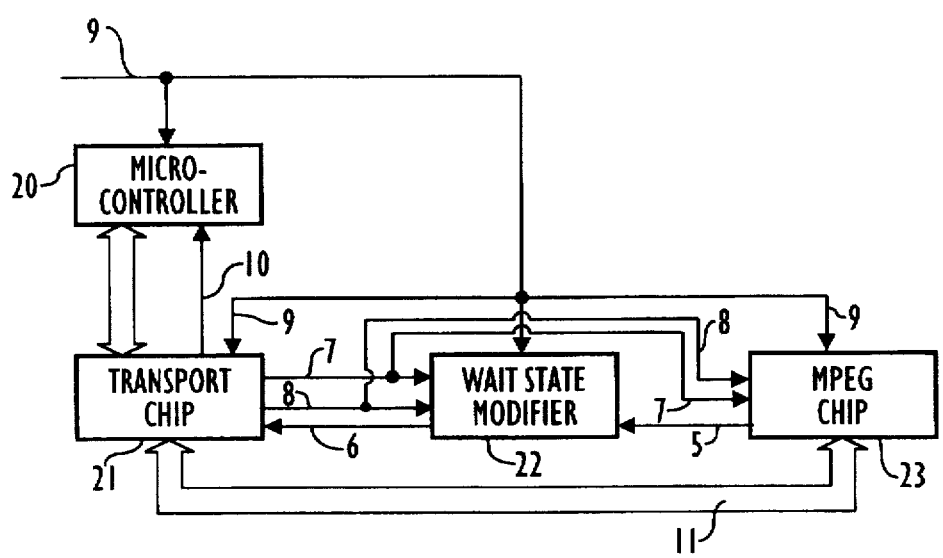
FIG. 1 illustrates an exemplary block diagram of a portion of a standard interface between a micro-controller, a transport chip and an MPEG decoder chip, employing the wait state modifier of the present invention.

FIG. 1 illustrates an exemplary block diagram of a portion of a standard interface between a micro-controller 20, a transport chip 21 and an MPEG decoder chip 23, employing the wait state modifier 22 of the present invention. During a read operation from the MPEG decoder chip 23, the transport chip 21 drives the chip select signal ("CS") 7 to the MPEG decoder chip 23 low, and signals a read transaction by leaving the read/write ("R/W") signal 8 to the MPEG decoder chip 23 at its default high state. The transport chip 21 also drives wait signal 10, to the micro-controller 20, low which halts the micro-controller until the requested data becomes available on the address/data bus 11. The MPEG decoder chip 23 then drives the wait line 5, to the wait state modifier 22, low to indicate that is fetching the requested data. The wait state modifier 22 in turn drives the wait signal 6 to the transport chip 21 low.

Once the MPEG decoder chip 23 transfers the requested data to the address/data bus 11, it releases the wait signal 5 to the wait state modifier 22, which then releases the wait signal 6 to the transport chip 21. The transport chip 21, upon receiving the wait signal 6 edge (transition from low to high), releases the wait signal 10 to the micro-controller 20 which indicates that the requested data is available on the address/data bus 11. The transport chip 21 requires the wait signal 6 edge before it releases the wait signal 10 to the micro-controller, otherwise the transport chip 21 drives the wait signal 10 to the micro-controller 20 for an excessively long default period.

Figure 2:
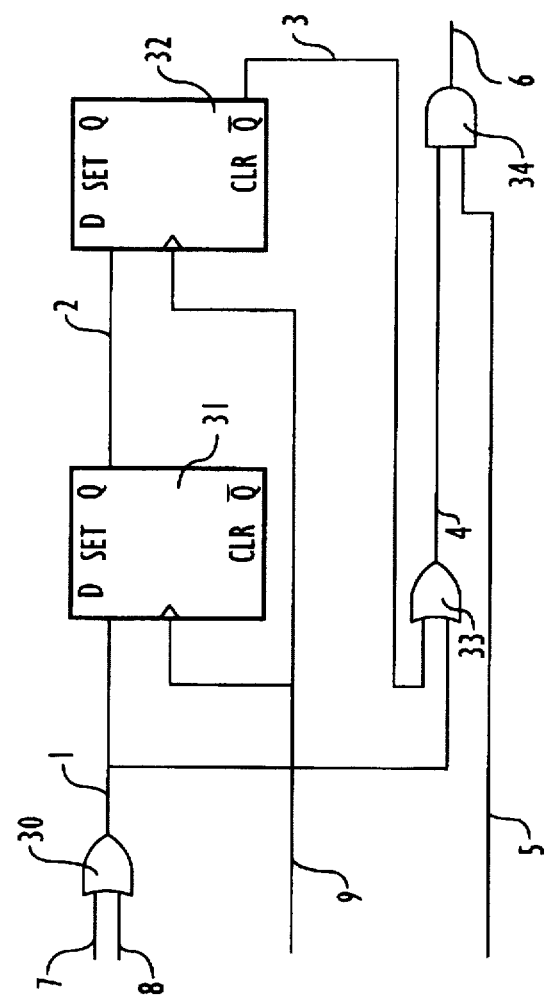
FIG. 2 illustrates an exemplary schematic of the wait state modifier of the present invention.
Figure 3A:
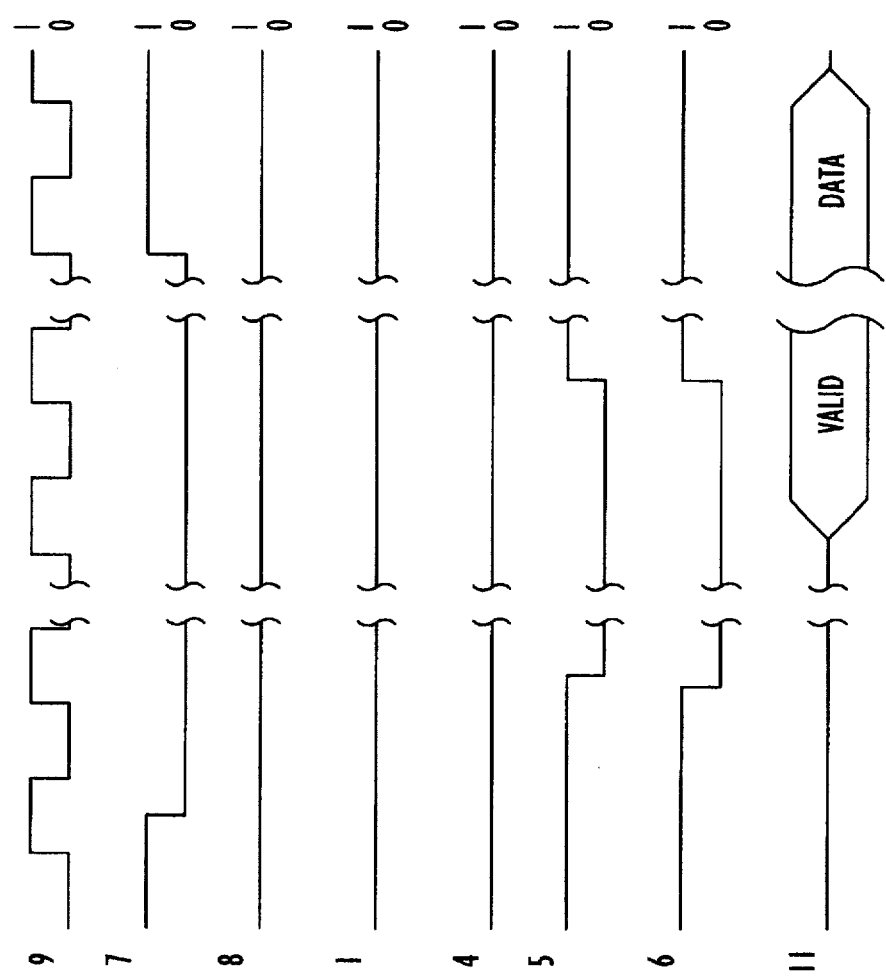
FIG. 3(a) illustrates the timing of the wait state modifier, as depicted in FIG. 2, during the execution of a read cycle.

FIG. 2 illustrates an exemplary schematic of the wait state modifier 22 of the present invention, and FIG. 3(a) illustrates the circuit's timing during a read cycle of the MPEG decoder chip 23. All edges are asynchronous to the clock during the read cycle. Prior to the initiation of the cycle, CS 7 and R/W 8 (the inputs to OR gate 30) are high, and thus signal 1 (the output of OR gate 30) and signal 2 (the output of flip-flop 31) are high, while signal 3 (the output of flip-flop 32) is low. Signals 1 and 3 are input into OR gate 33 which generates a high as signal 4. With signal 4 high, AND gate 34 outputs wait signal 6 at the same level as wait signal 5. Upon initiation of the read cycle, CS 7 is driven low while R/W 8 remains high, and thus signals 1 and 4 remain high. AND gate 34, therefore continues outputting wait signal 6 at the same level as wait signal 5. Once the MPEG decoder chip 23 places the requested data on the address/data bus 11, it releases wait signal 5 which creates the wait signal edge required by the transport chip 21. The wait state modifier 22 passes the wait signal edge on to the transport chip 21 which then releases the wait signal 10 to the micro-controller.

During a write operation to the MPEG decoder chip 23, the transport chip 21 drives CS 7 to the MPEG decoder chip 23 low, and signals a write transaction by driving the R/W 8 to the MPEG decoder chip 23 low. The transport chip 21 again drives wait signal 10, to the micro-controller 20, low which halts the micro-controller until the MPEG decoder chip has completed the write cycle. The MPEG decoder chip 23 receives the data, but continues to transmit a high on wait signal 5 to the wait state modifier 22. The wait state modifier 22, however, senses the condition of the CS 7 and R/W 8 signals being low, and generates the necessary edges on wait signal 6 to prevent the transport chip 21 from unnecessarily halting the micro-controller 20 for an excessively long default wait period. The wait state modifier 22 generates a falling edge on wait signal 6, to the transport chip 21, which coincides with the falling edges of CS 7 and R/W 8. Two clock cycles after the falling edge on wait signal 6, the wait state modifier 22 releases wait signal 6, thereby generating a rising edge on wait signal 6 to the transport chip 21. The transport chip 21 then releases the wait signal 10 to the micro-controller which signals the completion of the write cycle.

Figure 3B:
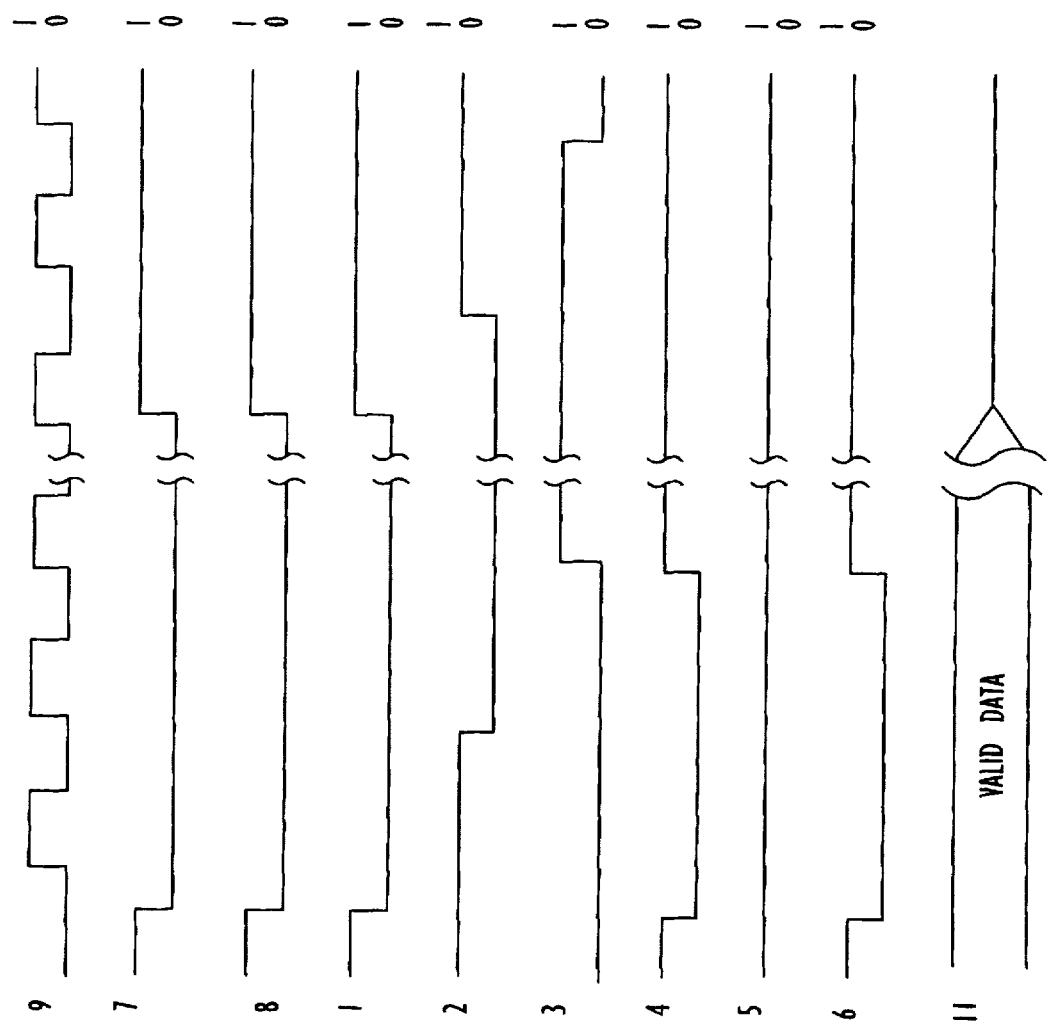
FIG. 3(b) illustrates the timing of the wait state modifier, as depicted in FIG. 2, during the execution of a write cycle.

FIG. 3(b) illustrates the timing of the wait state modifier schematic in FIG. 2 during a write cycle. Prior to the initiation of the cycle, as above, CS 7 and R/W 8 (the inputs to OR gate 30) are high, and thus signal 1 (the output of OR gate 30) and signal 2 (the output of flip-flop 31) are high, while signal 3 (the output of flip-flop 32) is low. Signals 1 and 3 are input into OR gate 33 which generates a high as signal 4. With signal 4 high, AND gate 34 outputs wait signal 6 at the same level as wait signal 5. Upon initiation of the write cycle, CS 7 and R/W 8 are driven low, and thus OR gate 30 outputs a low on signal 1. With lows on signals 1 and 3, OR gate 33 generates a low, and thus signal 4 transitions from high to low with signal 1. Signal 5 remains high and therefore, wait signal 6 also transitions from high to low with signals 4 and 1, which coincides with the first transition of CS 7 and R/W 8. Up to this point, all edges have been asynchronous to the clock. At the next clock, flip-flop 31 generates a low on signal 2, and one clock thereafter, flip-flop 32 generates a high on signal 3. OR gate 33 then generates a high on signal 4, and accordingly, AND gate 34 generates a high on wait signal 6. The transport chip 21 receives the edge (transition from low to high) on wait signal 6, signaling that the MPEG decoder chip 23 has received the data, and the transport chip 21 then releases the wait signal 10 to the micro-controller 20. Without the rising edge on wait signal 6, the transport chip 21 would drive a wait signal to the micro-controller for an excessively long default period. The wait state modifier 22 of the present invention, however, increases system performance by eliminating such unnecessarily excessive default wait periods during write cycles to the MPEG decoder chip 23.

The wait state modifier of the present invention, therefore, provides an important solution to the interface of some commercial application specific IC's, including transport and MPEG decoder chips.

Of course, it should be understood that a wide range of changes and modifications can be made to the embodiment described above. For example, the present invention could be configured as a synchronous or an asynchronous circuit. It is therefore intended that the foregoing detailed description be regarded as illustrative rather than limiting and that it be understood that it is the following claims, including all equivalents, which are intended to define the scope of the invention.

What is claimed is:

1. A data processing circuit, comprising:

a transport chip for routing data;

a decoder chip; and a digital edge generating circuit responsive to a first wait signal from said decoder chip and to at least one control signal to said decoder chip for generating a second wait signal to said transport chip for minimizing default timing conditions therein.

2. The data processing circuit of claim 1, wherein said at least one control signal comprises a chip select signal, and a read/write signal.

3. A data processing circuit, comprising:

a transport chip for routing data;

a digital edge generating circuit for sensing a predetermined pattern of digital input signals and for generating related transitions in a digital output signal, said digital edge generating circuit comprising:

first and second digital input signals;

a first OR gate having first and second inputs and an output, the first input being connected to the first digital input signal and the second input being connected to the second digital input signal;

a first flip-flop with an input connected to the output of the first OR gate, and having both an output signal and an inverse output signal;

a second flip-flop with an input connected to the output of the first flip-flop, and having both an output and an inverse output signal;

a second OR gate having first and second inputs and an output, the first input being connected to the output of the first OR gate and the second input being connected to the inverse output of the second flip-flop; and an AND gate having first and second inputs and an output, the first input being connected to the output of the second OR gate, the second input being connected to a third digital input signal and the output comprising a digital output of the digital edge generating circuit.

4. The data processing circuit of claim 3, further comprising an MPEG decoder chip, and wherein the first digital input comprises a chip select signal to said MPEG decoder chip, the second digital input signal comprises a read/write signal to said MPEG decoder chip, the third digital input signal comprises a wait signal from said MPEG decoder chip and the digital output comprises a wait signal to said transport chip.

5. A circuit for use with a data processing unit comprising a transport chip for routing data and a decoder chip, the circuit comprising:

- a first input for receiving a first wait signal from said decoder chip;
- a second input for receiving at least one control signal to said decoder chip; and
- a logic circuit in communication with the first and second inputs, the logic circuit being responsive to said first wait signal and to said at least one control signal for generating a second wait signal for minimizing default timing conditions in the transport chip.

6. The circuit of claim 5, wherein the at least one control signal comprises a chip select signal, and a read/write signal.

7. The circuit of claim 5, wherein said second wait signal is generated when the logic circuit receives said first wait signal from said decoder chip or when said at least one control signal indicates a predetermined condition of the data processing unit.

8. The circuit of claim 7 wherein when said second wait signal is initiated by said first wait signal, said second wait signal is terminated when said first wait signal is terminated, and when said second wait signal is initiated by said at least one control signal, said second wait signal is terminated after a predetermined delay.

9. The circuit of claim 7, wherein the predetermined condition comprises a start of a write request to said decoder chip.

* * * * *